United States Patent
Ungureanu et al.

(10) Patent No.: US 9,818,174 B2
(45) Date of Patent: Nov. 14, 2017

(54) STREAMLINED HANDLING OF MONITOR TOPOLOGY CHANGES

(71) Applicant: Microsoft Technology Licensing, LLC, Redmond, WA (US)

(72) Inventors: Oreste Dorin Ungureanu, Duvall, WA (US); Zhigang Xu, Bellevue, WA (US); Amos Eshel, Seattle, WA (US); Shalini Akella, Sammamish, WA (US); Marcus Andrews, Bellevue, WA (US); Leonardo Blanco, Redmond, WA (US); Lucas Brodzinski, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/494,825

(22) Filed: Sep. 24, 2014

(65) Prior Publication Data
US 2016/0086313 A1 Mar. 24, 2016

(51) Int. Cl.
*G06T 17/00* (2006.01)
*G06T 3/40* (2006.01)
(Continued)

(52) U.S. Cl.
CPC .......... *G06T 3/4092* (2013.01); *G06F 3/1431* (2013.01); *G06T 1/60* (2013.01);
(Continued)

(58) Field of Classification Search
CPC ......... G06T 17/20; G06T 15/00; G06T 15/04; G06T 2210/36; G09G 5/391
See application file for complete search history.

(56) References Cited

U.S. PATENT DOCUMENTS 5,257,350 A   10/1993 Howard et al.
6,570,546 B1 *  5/2003 Welker .................. G06F 3/1446
                                                         345/1.1
(Continued)

FOREIGN PATENT DOCUMENTS

EP         2474904 A2      7/2012
EP         2672376 A2     12/2013
WO    WO2008035142 A1      3/2008

OTHER PUBLICATIONS

PCT Search Report and Written Opinion for Application No. PCT/US2015/050321, dated Dec. 16, 2015, 16 pages.
(Continued)

*Primary Examiner* — Abderrahim Merouan
(74) *Attorney, Agent, or Firm* — Arent Fox LLP

(57) ABSTRACT

Transitions between monitor configurations may be streamlined by minimizing the tearing down and recreating of render targets and primary frame buffers associated with the monitors. In at least one example, the techniques described herein include identifying at least one render target in a first monitor configuration that is also in a second monitor configuration. In response to identifying the at least one render target in the first monitor configuration that is also in the second monitor configuration, the techniques herein describe maintaining the at least one render target during a transition between the first monitor configuration to second monitor configuration.

20 Claims, 5 Drawing Sheets

(51) Int. Cl.
*G09G 5/14* (2006.01)
*G09G 5/36* (2006.01)
*G09G 5/00* (2006.01)
*G06T 1/60* (2006.01)
*G06F 3/14* (2006.01)
*H04N 21/41* (2011.01)
*H04N 21/442* (2011.01)
*G06T 15/04* (2011.01)
*G06T 17/20* (2006.01)
*G06T 15/00* (2011.01)
*G09G 5/391* (2006.01)

(52) U.S. Cl.
CPC ............... *G09G 5/001* (2013.01); *G09G 5/14* (2013.01); *G09G 5/363* (2013.01); *H04N 21/4122* (2013.01); *H04N 21/44227* (2013.01); *G06T 15/00* (2013.01); *G06T 15/04* (2013.01); *G06T 17/20* (2013.01); *G06T 2200/16* (2013.01); *G06T 2200/28* (2013.01); *G06T 2210/36* (2013.01); *G09G 5/391* (2013.01); *G09G 2340/04* (2013.01); *G09G 2360/02* (2013.01); *G09G 2360/04* (2013.01); *G09G 2360/08* (2013.01); *G09G 2360/12* (2013.01)

(56) References Cited

U.S. PATENT DOCUMENTS

| | | | |
|---|---|---|---|
| 7,432,941 | B2 | 10/2008 | Parent et al. |
| 8,601,195 | B2 | 12/2013 | Smith |
| 2005/0246329 | A1 | 11/2005 | Milirud et al. |
| 2009/0199127 | A1 | 8/2009 | Sareen et al. |
| 2009/0219441 | A1* | 9/2009 | Kurita .................. G06F 3/1431 348/571 |
| 2010/0115020 | A1 | 5/2010 | Hochmuth et al. |
| 2010/0138780 | A1* | 6/2010 | Marano ................ G06F 3/1415 715/804 |
| 2010/0238089 | A1 | 9/2010 | Massand |
| 2010/0299436 | A1* | 11/2010 | Khalid ................. G06F 1/1643 709/226 |
| 2010/0328447 | A1 | 12/2010 | Watson |
| 2011/0032338 | A1* | 2/2011 | Raveendran ......... H04N 21/816 348/51 |
| 2011/0216245 | A1* | 9/2011 | Kyriazis ................. H04N 5/38 348/723 |
| 2011/0304713 | A1* | 12/2011 | Tardif .................. G06F 3/1423 348/54 |
| 2012/0072609 | A1* | 3/2012 | Rajamani .......... H04N 21/4122 709/231 |
| 2012/0176396 | A1* | 7/2012 | Harper ................. G06F 3/1431 345/589 |
| 2013/0067344 | A1 | 3/2013 | Ungureanu et al. |
| 2013/0328878 | A1* | 12/2013 | Stahl .................... G06F 3/1431 345/428 |

OTHER PUBLICATIONS

"DXGI Overview", Published on: Apr. 19, 2012 Available at: http://msdn.microsoft.com/en-us/library/windows/desktop/bb205075(v=vs.85).aspx, 6 Pages.

The PCT Written Opinion of the International Preliminary Examining Authority dated May 19, 2016 for PCT application No. PCT/US2015/050321, 8 pages.

"International Preliminary Report on Patentability Issued in PCT Application No. PCT/US2015/050321", dated Sep. 1, 2016, 7 Pages.

* cited by examiner

STREAMLINED HANDLING OF MONITOR TOPOLOGY CHANGES

BACKGROUND

An increasing number of users are using multiple monitors for interacting with computing systems. As a result, users often add monitors to a computing system or reconfigure monitors associated with a computing system from time to time. Current implementations for changing monitor configurations tear down all render targets and primary frame buffers for an original monitor configuration, reprogram monitor timing, and recreate new render targets for new monitor configurations. For monitors that are attached to graphics processing units, black frames are displayed on the monitors before and after the reconfiguration. As a result, current techniques result in poor user experience.

SUMMARY

Techniques for streamlining transitions between monitor configurations are described herein. In at least one example, the techniques described herein streamline transitions between monitor configurations by minimizing the tearing down and recreating of render targets and primary frame buffers associated with the monitors during the transitions. In the at least one example, the techniques described herein maintain the render targets and primary frame buffers across the transitions and minimize updates required to reconfigure the monitors. Additionally, the techniques described herein improve transitions between monitor configurations by reducing the changes to re-programming monitor time by using graphics processing units (GPU) to transform graphical data and/or user interface (UI) window data.

The techniques described herein include generating render targets for monitors in a first monitor configuration. Upon receiving a notification of a change in the first monitor configuration, the techniques described herein include initiating a transition between the first monitor configuration and a second monitor configuration. The second monitor configuration may include an addition and/or removal of a monitor from the first monitor configuration, a rearrangement of the monitors in the first monitor configuration, and/or a mode change associated with the monitors in the first monitor configuration. The techniques described herein include identifying at least one render target in the first monitor configuration that is also in the second monitor configuration and, in response to identifying the at least one render target in the first monitor configuration that is also in the second monitor configuration, maintaining the at least one render target in the transition between the first monitor configuration and the second monitor configuration and applying at least one transform to graphical data and/or UI window data to be rendered in the second monitor configuration. Additionally or alternatively, in some examples, the techniques described herein reserve monitor timing associated with the transition by maintaining monitor native timing and applying transforms to graphical data and/or UI window data for presentation on monitors in the second monitor configuration.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

DESCRIPTION OF FIGURES

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
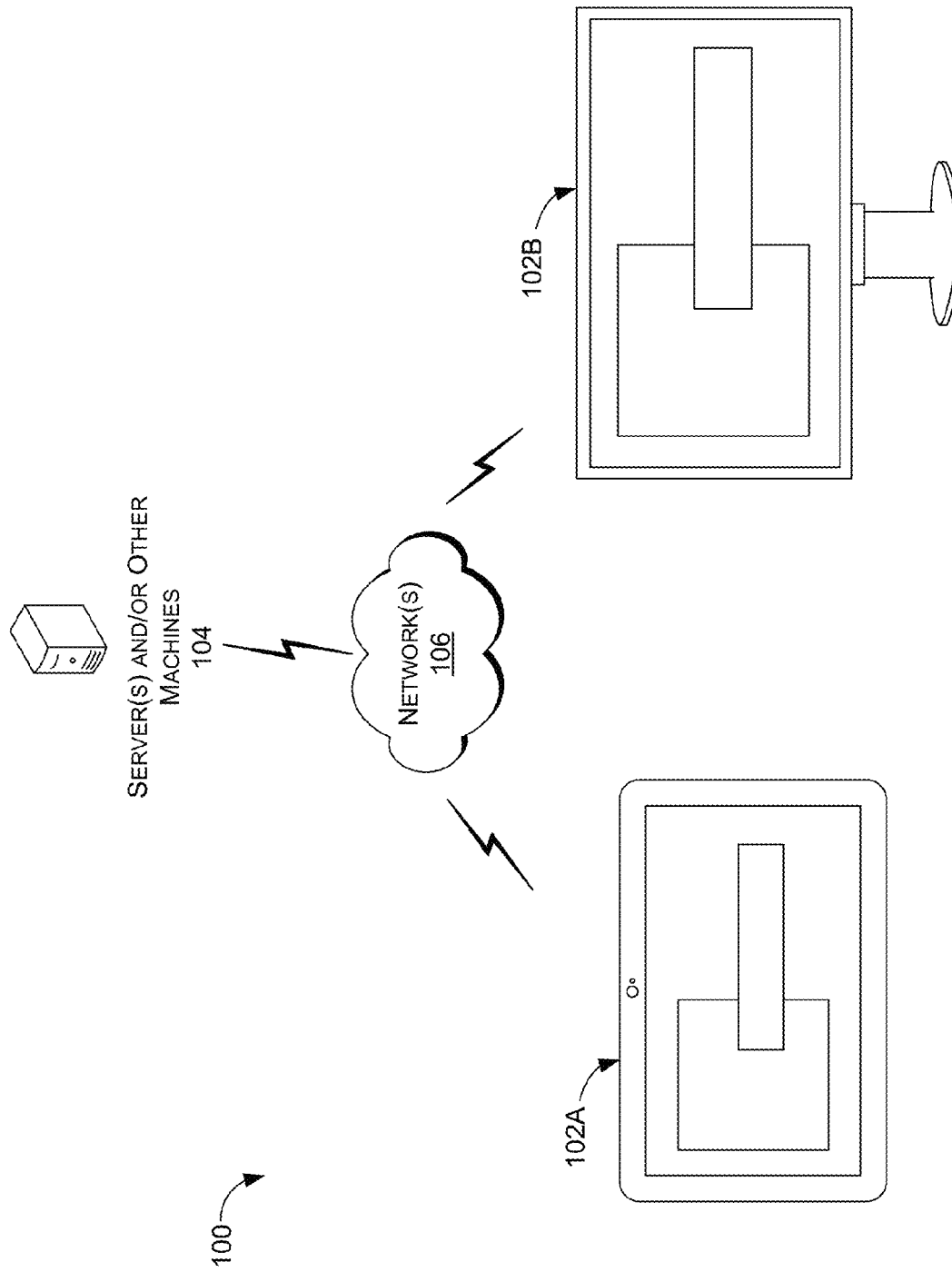
FIG. 1 illustrates an example environment in which techniques for streamlining transitions between monitor configurations can be embodied.

Techniques for streamlining transitions between monitor configurations are described herein. Generally, geometries of monitors associated with different devices may differ with respect to a size of the monitor, a resolution of the monitor, etc. For example, a monitor may have a dpi resolution above a predetermined threshold and a different monitor may have a dpi resolution below a predetermined threshold. Changes to monitor configurations may result in displaying graphical data and/or UI window data that is inappropriate for and/or incompatible with a monitor of a particular user device. In some examples, the graphical data and/or UI window data may not be properly aligned following modifications to monitor configurations. For monitors that are attached to GPUs (e.g., graphics devices, video cards, etc.), black frames are often displayed on the monitors before and after the reconfiguration because in some examples, implementations for changing monitor configurations tear down all render targets and primary frame buffers for an original monitor configuration, reprogram monitor timing for new configurations, and recreate new render targets for new monitor configurations.

A render target is a buffer where a GPU draws graphical data and/or UI window data for a presentation to be rendered on a UI of a user device. Render targets may be used to store information such as color and surface information of objects, surface normals, depth information used to calculate reflection of light, specularity of a surface, ambient occlusion data, etc. In at least some examples, the render targets may be backed by primary frame buffers. Primary frame buffers are surfaces from which hardware presents UIs to a collection of monitors and other display devices in the monitor configuration that may be connected to display adapters.

Monitor timing may describe a display resolution and/or mode associated with individual monitors in a monitor configuration. For example, monitors may use different timing to display a first monitor configuration (e.g., 1024×768 60 Hz) and a second monitor configuration (e.g., 1600×1200 60 Hz). Monitor timing depends on a type of a monitor and a type of connection.

As users increasingly use multiple monitors and/or user devices for displaying content, the demand for seamless transitions has increased. For instance, users increasingly carry hand-held devices, such as laptop computers, tablet computers, etc., that they connect to other user devices such as projectors, additional monitors, etc. The series of black frames that result when a hand-held device is connected to a projector or additional monitor is undesirable and makes for a poor user experience. Additionally, inappropriate displays and/or incompatible data make for poor user experiences.

The techniques described herein, however, may be leveraged for eliminating the black frames and other drawbacks currently experienced by users and as a result, may improve user experience. The techniques described herein streamline transitions between monitor configurations by minimizing the tearing down and recreating of render targets and primary frame buffers associated with the monitors. In at least one example, the techniques described herein maintain the render targets and primary frame buffers across the transitions and minimize updates required to reconfigure the monitors. Additionally, the techniques described herein improve transitions between monitor configurations by reserving monitor timing for transitions between monitor configurations. In at least one example, the techniques described herein use GPUs to transform graphical data and/or UI window data and avoid re-programming monitor timing to effectuate the transition. As a result of at least the maintaining the render targets, primary frame buffers, and monitor timing, transitioning from a first monitor configuration to a second monitor configuration may occur without the black frames and other drawbacks that are experienced using current techniques. Accordingly, the techniques described herein streamline transitions between monitor configurations.

Illustrative Environment

The environments described below constitute but one example and are not intended to limit application of the system described below to any one particular operating environment. Other environments may be used without departing from the spirit and scope of the claimed subject matter. The various types of processing described herein may be implemented in any number of environments including, but not limited to, stand alone computing systems, network environments (e.g., local area networks or wide area networks), peer-to-peer network environments, distributed-computing (e.g., cloud-computing) environments, etc.

FIG. 1 illustrates an example environment 100 in which techniques for streamlining transitions between monitor configurations can be embodied. Environment 100 includes monitors 102A and 102B arranged in a monitor topology. Monitors 102A and/or 102B may be associated with computing devices, as described below. Monitors 102A and 102B may be associated with computing devices via wired connections (e.g., HD15, DVI, HDMI, S-video, composite video, component video, LVDS, display port, USB, etc.) and/or wireless connections (e.g., Miracast, DLNA, RDP, WiGig, etc.). Environment 100 also includes one or more server(s) and/or other machines 104 and communication network(s) 106. In some examples, the server(s) and/or other machines 104 may include one or more computing devices that operate in a cluster or other grouped configuration to share resources, balance load, increase performance, provide fail-over support or redundancy, or for other purposes which enable communication between the computing devices associated with the monitors (e.g., 102A and 102B) and the one or more server(s) and/or other machines 104. The communication network(s) 106 may be any type of network known in the art, such as the Internet and as described below.

The monitors 102A and 102B present one or more application interfaces on a graphical UI, or display. In at least one example, the monitors 102A and 102B represent driver-attached representations of surfaces that may be exposed to a system as a user mode renderable construct to which an operating system and/or application(s) may draw graphical data and/or UI window data. The techniques described herein enable smooth transitions during reconfigurations of the monitor topology by identifying changes in the monitor topology that leverage changes to scale and/or parameters and eliminate transition artifacts to avoid rebuilding the driver level surface. That is, the techniques described herein include identifying at least one render target in the first monitor configuration that is also in the second monitor configuration and, in response to identifying the at least one render target in the first monitor configuration that is also in the second monitor configuration, maintaining the at least one render target in the transition between the first monitor configuration and the second monitor configuration and applying a transform to graphical data and/or UI window data to be rendered in the second monitor configuration. Additionally, the techniques described herein improve transitions between monitor configurations by reserving monitor timing and using GPUs to transform graphical data and/or UI window data, instead of re-programming monitor timing during the transition.

Figure 2:
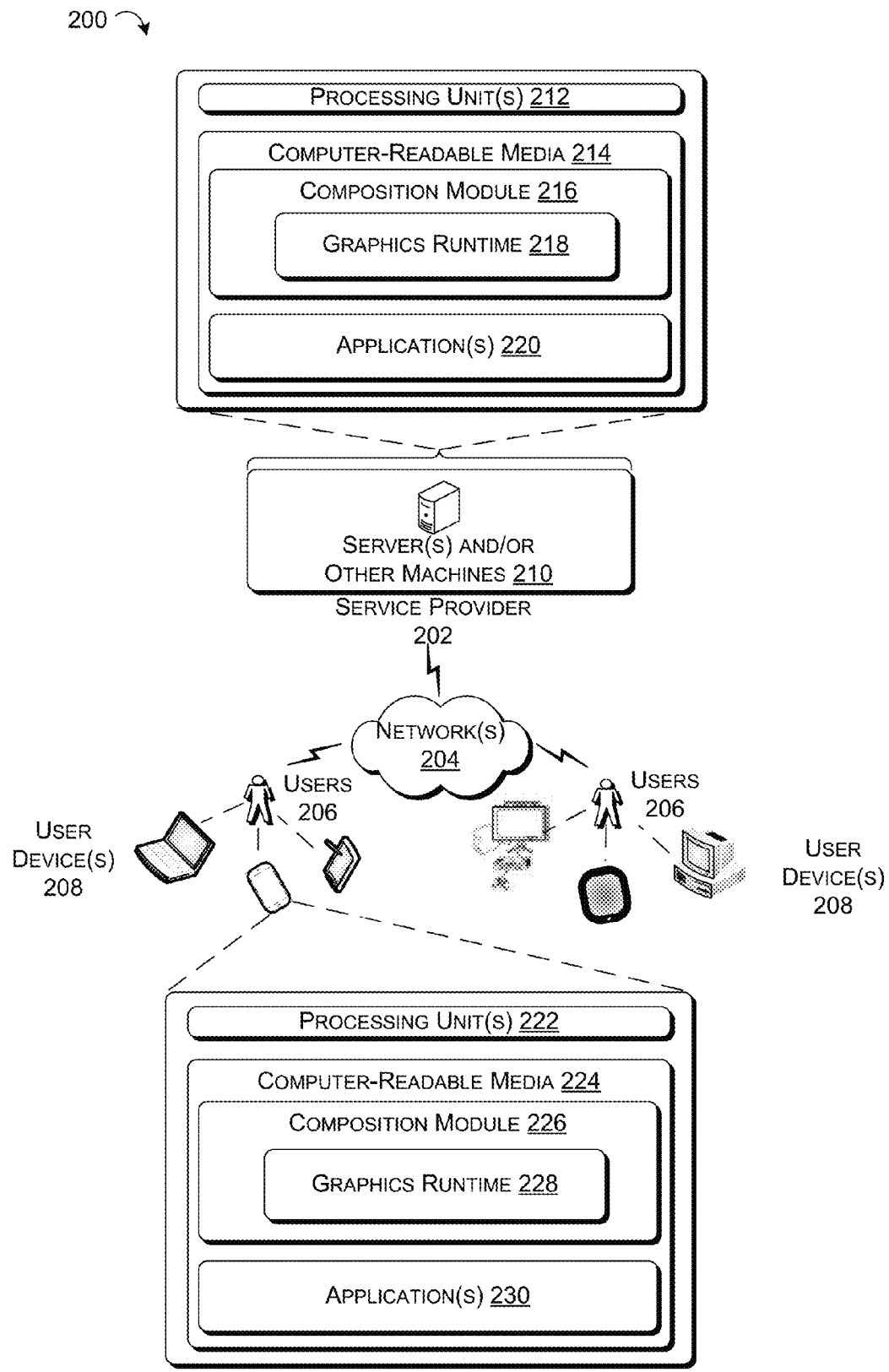
FIG. 2 illustrates an example operating environment that includes a variety of devices and components that may be implemented in a variety of environments for streamlining transitions between monitor configurations.

FIG. 2 illustrates an example operating environment 200 that includes a variety of devices and components that may be implemented for streamlining transitions between monitor configurations. In at least one example, the techniques described herein may be performed remotely (e.g., by a server, cloud, etc.). In some examples, the techniques described herein may be performed locally on a computing device, as described below.

More particularly, the example operating environment 200 may include a service provider 202, one or more network(s) 204, one or more users 206, and one or more user devices 208 associated with the one or more users 206.

As shown, the service provider 202 may include one or more server(s) and other machines 210, any of which may include one or more processing unit(s) 212 and computer-readable media 214. The server(s) and other machines 210 may be the same one or more server(s) and other machines 104 as shown in FIG. 1. In various embodiments, the service provider 202 may streamline transitions between monitor configurations such as the monitor topology 100 shown in FIG. 1.

In some embodiments, the network(s) 204 may be any type of network known in the art, such as the Internet. The network(s) 204 may be the same as network(s) 106 as shown in FIG. 1. Moreover, the user devices 208 may communicatively couple to the network(s) 204 in any manner, such as by a global or local wired or wireless connection (e.g., local area network (LAN), intranet, etc.). The network(s) 204 may facilitate communication between the server(s) and other machines 210 and the user devices 208 associated with the users 206.

In some embodiments, the users 206 may operate corresponding user devices 208 to perform various functions associated with the user devices 208, which may include one or more processing unit(s), computer-readable storage media, and a display. Furthermore, the users 206 may utilize the user devices 208 to communicate with other users 206 via the one or more network(s) 204.

User device(s) 208 can represent a diverse variety of device types and are not limited to any particular type of device. Examples of user device(s) 208 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like. The monitors 102A and 102B in FIG. 1 may comprise any of the computing devices 208 described above. Alternatively, the monitors 102A and 102B may be associated with any of the computing devices 208 described above for rendering a graphical UI.

The service provider 202 may be any entity, server(s), platform, etc., that may leverage a collection of features from communication platforms, including online communication platforms. Moreover, and as shown, the service provider 202 may include one or more server(s) and/or other machines 210, which may include one or more processing unit(s) 212 and computer-readable media 214 such as memory. The one or more server(s) and/or other machines 210 may include devices, as described below.

Examples support scenarios where device(s) that may be included in the one or more server(s) and/or other machines 210 can include one or more computing devices that operate in a cluster or other grouped configuration to share resources, balance load, increase performance, provide failover support or redundancy, or for other purposes. Device(s) included in the one or more server(s) and/or other machines 210 can belong to a variety of categories or classes of devices such as traditional server-type devices, desktop computer-type devices, mobile devices, special purpose-type devices, embedded-type devices, and/or wearable-type devices. Thus, although illustrated as desktop computers, device(s) can include a diverse variety of device types and are not limited to a particular type of device. Device(s) included in the one or more server(s) and/or other machines 210 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) that may be included in the one or more server(s) and/or other machines 210 can include any type of computing device having one or more processing unit(s) 212 operably connected to computer-readable media 214 such as via a bus, which in some instances can include one or more of a system bus, a data bus, an address bus, a PCI bus, a Mini-PCI bus, and any variety of local, peripheral, and/or independent buses. Executable instructions stored on computer-readable media 214 can include, for example, composition module 216, graphics runtime 218, and other modules, programs, or applications that are loadable and executable by processing units(s) 212. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device(s) that may be included in the one or more server(s) and/or other machines 210 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Devices that may be included in the one or more server(s) and/or other machines 210 can also include one or more network interfaces coupled to the bus to enable communications between computing device and other networked devices such as user device(s) 208. Such network interface(s) can include one or more network interface controllers (NICs) or other types of transceiver devices to send and receive communications over a network. For simplicity, some components are omitted from the illustrated device.

Processing unit(s) 212 and can represent, for example, a central processing unit (CPU)-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various embodiments, the processing unit(s) 212 may execute one or more modules and/or processes to cause the server(s) and/or other machines 210 to perform a variety of functions, as set forth above and explained in further detail in the following disclosure. Additionally, each of the processing unit(s) 212 may possess its own local memory, which also may store program modules, program data, and/or one or more operating systems.

In at least one example, the computer-readable media 214 of the server(s) and other machines 210 may include components that facilitate interaction between the service provider 202 and the users 206. For instance, the computer-readable media 214 may include at least a composition module 216 that can be implemented as computer-readable instructions, various data structures, and so forth via at least one processing unit(s) 212 to configure a device to execute instructions and to perform operations implementing transitions between monitor configurations. In at least one example, the composition module 216 determines how operating systems and/or applications display graphical data and/or UI window data on monitors associated with user devices 208. In some examples, the composition module 216 may include graphics runtime 218. In at least one example, the graphics runtime 218 may perform tasks such as enumerating hardware devices, presenting rendered frames to an output, controlling gamma, managing a full-screen transition, etc. Functionality to perform these operations may be included in multiple devices or a single device.

The computer-readable media 214 may additionally include application(s) 220 associated with various operations. The application(s) 220 may render content associated with the various operations on the monitors associated with the user device(s) 208.

In at least some examples, the operations described below may be performed by one or more server(s) and/or other machines 210 and/or one or more of the user devices 208. The user devices 208 may include processing unit(s) 222 that may include the same type of processing units to perform the same functionalities as described above regarding processing unit(s) 212. The user devices 208 may also include computer-readable media 224 including components that facilitate interaction between the service provider 202 and the users 206. For instance, the computer-readable media 224 may include at least a composition module 226 that can be implemented as computer-readable instructions, various data structures, and so forth via at least one processing unit(s) 222 to configure a device to execute instructions and to perform operations implementing transitions between monitor configurations. In some examples, the composition module 226 may include graphics runtime 228. The composition module 226 and/or graphics runtime 228 may perform the same functionality and/or operations as composition module 216 and graphics runtime 218, respectively. The computer-readable media 224 may additionally include application(s) 230 associated with various operations. The application(s) 230 may render content associated with the various operations on the monitors associated with the user device(s) 208.

Depending on the exact configuration and type of the one or more server(s) and/or other machines 210, computer-readable media (e.g., computer-readable 214 and computer-readable media 224) may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. As defined herein, computer storage media does not include communication media.

Figure 3:
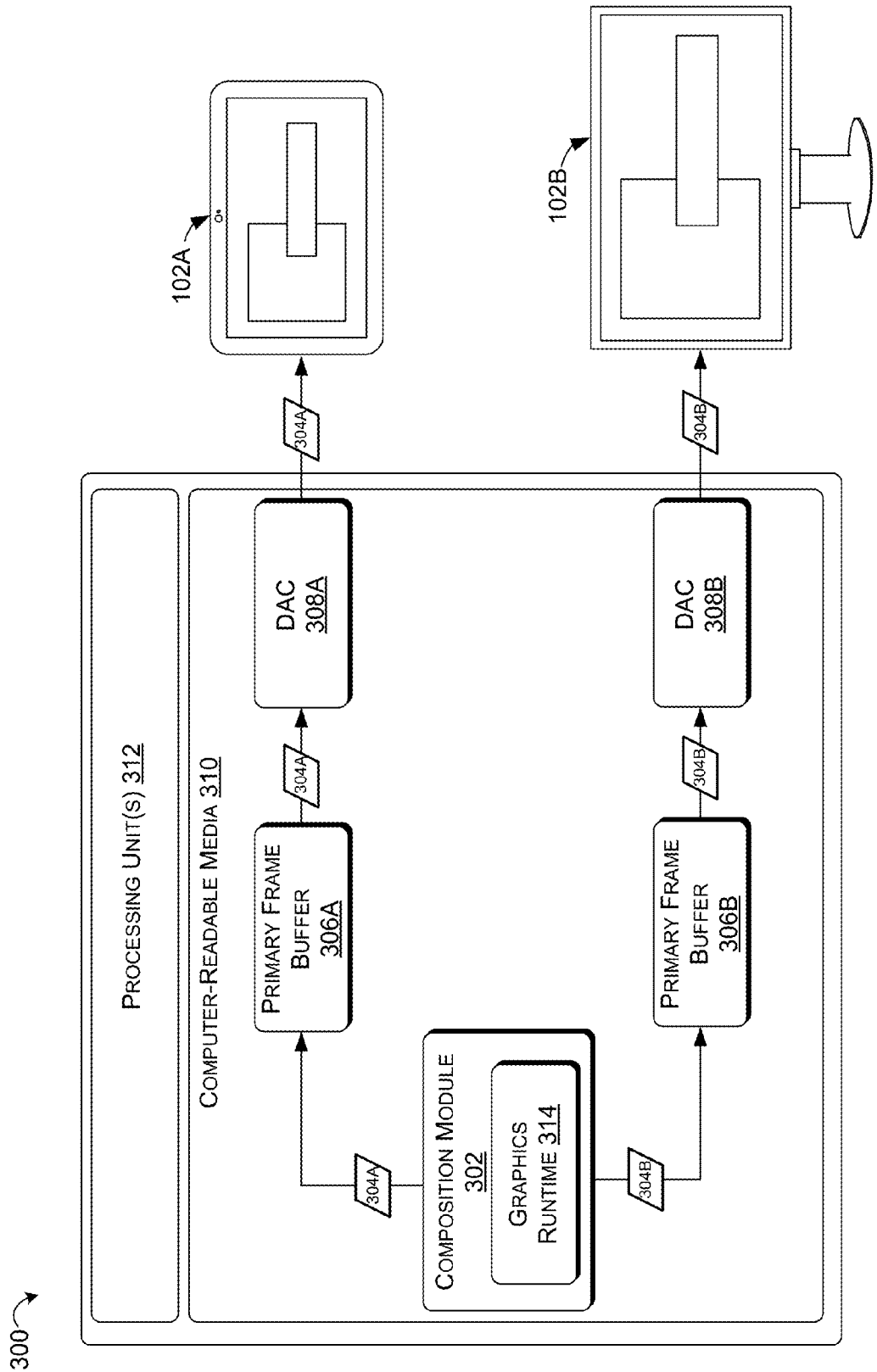
FIG. 3 illustrates an example operating environment for streamlining transitions between monitor configurations.

FIG. 3 illustrates an example operating environment 300 for streamlining transitions between monitor configurations. In at least one example, a composition module 302 (e.g., composition module 216 and/or composition module 226) may send data 304A and/or 304B to primary frame buffers 306A and/or 306B and digital-to-analog converters (DAC) 308A and/or 308B. The DACs 308A and/or 308B output data 304A and/or 304B to monitors 102A and 102B, respectively. In at least one example, the monitors 102A and 102B may be attached to a driver for rendering graphical data and/or UI window data on the graphical UIs of the monitors 102A and 102B.

In at least one example, the composition module 302, primary frame buffers 306A and/or 306B, and DACs 308A and/or 308B may be stored in computer-readable media 310 (e.g., computer-readable media 214 or computer-readable media 224). One or more processing unit(s) 312 (e.g., processing unit(s) 212 and/or 222) may execute one or more modules and/or processes to cause the composition module 302, primary frame buffers 306A and/or 306B, and DACs 308A and/or 308B to perform a variety of functions, as set forth above and explained in further detail below.

The one or more processing unit(s) 312 may include one or more GPUs. The one or more processing unit(s) 312 may be used for generating graphical data and/or UI window data and providing functionalities to a graphics runtime 314 (e.g., graphics runtime 218 and/or graphics runtime 228) associated with the composition module 302. The graphics runtime 314 may utilize the functionalities of the one or more GPUs (e.g., processing unit(s) 312) for processing graphical data and/or UI window data. In at least one example, the primary frame buffers 306A and/or 306B may be controlled by same GPUs. In other examples, the primary frame buffers 306A and/or 306B may be controlled by different GPUs.

The data 304A and 304B may represent graphical data and/or UI window data. In some examples, data 304A and 304B represent a same composition tree for rendering data to monitors 102A and 102B. In other examples, data 304A and 304B represent composition trees for rendering data to monitors 102A and 102B that include different pieces of graphical data and/or UI window data for rendering different graphical UI presentations. As the data 304A and/or 304B progress from the composition module 302 to the primary frame buffers 306A and/or 306B to the DACs 308A and/or 308B and the monitors 102A and/or 102B, the data 304A and/or 304B may change formats. For example, data 304A and/or 304B that is output from the composition module 302 may comprise an array of ARGB color format for the pixels in the graphical data and/or UI window data. The data 304A and/or 304B output from the primary frame buffers 306A and/or 306B may vary depending on the one or more processing unit(s) 312 and the implementation of the graphical processing unit(s). The data 304A and/or 304B that is output from the DACs 308A and/or 308B may be a color format for the pixels in the graphical data and/or UI window data represented via monitor timing.

In at least one example, a composition module 302 may determine how operating systems and/or applications display graphical data and/or UI window data on monitors associated with user devices 208. In at least one example, graphical data and/or UI window data may be stored in a graphical composition tree made up of nodes. A root node of the tree may represent a UI window and sub-nodes of the tree may represent application windows within the UI window. Each of the sub-nodes may contain more sub-nodes that represent pieces of graphical data associated with the applications. The composition module 302 may traverse the graphical composition tree to present the graphical data and/or UI window data to monitors, such as monitors 102A and/or 102B. In at least one example, GPUs may be attached to the monitors 102A and/or 102B and the GPUs may be leveraged to present the graphical data and/or UI window data on the monitor of the computing device 208.

Additionally, the composition module 302 may generate render targets for graphical data and/or UI window data to be rendered on a UI of a user device 208, such as monitor 102A and/or 102B, via rendering on a primary frame buffer 306A and/or 306B. In at least one example, the composition module 302 may draw the graphical composition tree representing graphical data and/or UI window data to at least one render target. In at least some examples, the composition module 302 may use the graphics runtime 314 to instruct the one or more processing unit(s) 312 to draw the graphical data and/or UI window data to the render target.

As described above, a render target is a buffer where a GPU may draw graphical data and/or UI window data for a presentation to be rendered on a UI of a user device 208. In at least one example, the render targets are full-screen render targets. Render targets may be used to store information such as color and surface information of objects, surface normals, depth information used to calculate reflection of light, specularity of a surface, ambient occlusion data, etc., as described above. For example, a render target may include a surface format which describes how many bits are allocated to each pixel and how they are divided between color (e.g., red, green, blue) and alpha. Additionally, each render target generally has a width and a height associated with a resolution of the display on the user device 208. In at least one example, the composition module 302 draws to the render targets at a native resolution. The native resolution of a monitor represents a single fixed resolution associated with different types of displays. For example, a native resolution of an LCD display may be 1366×768. Drawing to the render targets at native resolutions may be useful for reserving monitor timing and reducing the changes to re-programming monitor timing during transitions between monitor configurations.

In some examples, the composition module 302 may generate multiple render targets that may be rendered at the same time and the set of render targets may be rendered to swap chains. In at least one example, a swap chain may be a collection of primary frame buffers associated with a monitor (e.g., monitor 102A or monitor 102B). A swap chain may include a list of primary frame buffers, such as front primary frame buffers and one or more back primary frame buffers. Monitors (e.g., monitor 102A and/or monitor 102B) may have multiple swap chains that may be created by different applications (e.g., any one of application(s) 220 and/or application(s) 230) associated with a monitor (e.g., monitor 102A and/or monitor 102B). A swap chain's render targets may be created at a particular size and in a particular format. In at least one example, the application (e.g., any one of application(s) 220 and/or application(s) 230) may specify these values at startup or the values may be determined based at least in part on the characteristics of the target display. These values may be modified as displays change as a result of user input and/or program events.

As described above, the render targets may be backed by primary frame buffers 306A and/or 306B. Primary frame buffers 306A and/or 306B are surfaces from which hardware presents UIs to a collection of monitors and other display devices (e.g., computing devices 208) in the monitor configuration that may be connected to display adapters. In at least one embodiment, the surfaces are unique DX surfaces from which the hardware scans out to the monitors attached to the GPUs.

The composition module 302 may include a graphics runtime 314 (e.g., graphics runtime 218 or graphics runtime 228). Graphics runtime 314 may represent a graphics infrastructure such as Microsoft® DirectX Graphics Infrastructure (DXGI), OpenGL™, etc. The graphics runtime 314 may perform tasks such as enumerating hardware devices, presenting rendered frames to an output, controlling gamma, managing a full-screen transition, etc. Additionally, the graphics runtime 314 may be used to program the GPUs so that the GPUs may render graphical data and/or UI window data. In at least one example, the graphics runtime 314 may leverage the render targets for presenting data 304A and 304B to output to primary frame buffers 306A and 306B, respectively. In at least some examples, the data 304A and 304B represents frames.

The GPUs may leverage the graphics runtime 314 to perform transforms before the data 304A and 304B is transferred to the primary frame buffers 306A and 306B. In at least one example, the graphics runtime 314 may change a position and shape of the graphical data and/or UI window data to be rendered on the UIs of user devices 102A and/or 102B. The graphics runtime 314 may rotate, skew, translate, and/or scale the graphical data and/or UI window data to be rendered on the UI (e.g., monitors 102A or 102B) of user devices 208. For example, if the first monitor configuration includes at least one monitor that has a size different from at least one monitor in the second monitor configuration, the graphics runtime 314 may apply a scalar transform to graphical data and/or UI window data to be rendered on the at least one monitor in the second monitor configuration that is a different size than the at least one monitor in the first monitor configuration. In at least one example, the graphics runtime 314 may stretch graphical data and/or UI window data (e.g., an image) to a native resolution of a monitor in the second monitor configuration so that the monitor displays the graphical data and/or UI window data on the second monitor configuration without re-programming monitor timing.

As described above, monitor timing may describe a display mode associated with individual monitors in a monitor configuration. For example, monitors may use different timing to display a first monitor configuration (e.g., 1024×768 60 Hz) and a second monitor configuration (e.g., 1600×1200 60 Hz). Monitor timing depends on a type of a monitor and a type of connection. For example, if a user wants to change monitor configurations from 1280×960 60 Hz to 1024×768 60 Hz on a 1600×1200 monitor, current techniques use a same monitor timing as the resolution desired in the second monitor configuration. That is, before a transition from a first monitor configuration to a second monitor configuration, current techniques use a 1280×960 render target and monitor time. During the transition, current techniques tear down a 1280×960 render target, reprogram monitor timing to 1024×768 60 Hz, re-create a 1024×768 render target, and display the 1024×768 graphical data and/or UI window data directly.

The graphics runtime 314, however, may be leveraged to reserve the monitor timing during the transition from the first monitor configuration to the second monitor configuration. In at least one example, a monitor native timing (e.g., 1600×1200) may be maintained before, during, and after the transition. As a result, a same render target may be used and transformed by a graphics device to stretch graphical data and/or UI window data to this native resolution (e.g., 1600× 1200) render target so that the monitor displays the graphical data and/or UI window data on the second monitor configuration, as described above. That is, the monitor in the second monitor configuration may display the graphical data and/or UI window data with a resolution that matches the native resolution of the monitor as a result of the graphics runtime 314 stretching the graphical data and/or UI window data previously having a resolution different from the native resolution of the monitor.

The composition module 302 outputs data 304A and/or 304B to the primary frame buffers 306A and 306B, respectively. The primary frame buffers 306A and 306B may be configured to generate a graphical UI presentation from a render target. The primary frame buffers 306A and 306B may output digital data to one of the DACs 308A and 308B. The DACs 308A or 308B convert the digital data input from the primary frame buffers 306A and 306B into analog signals that may be output to screen drivers to display graphical data and/or UI window data (e.g., monochrome or color images, etc.) on the UIs of user devices 208 (such as monitors 102A and 102B).

The composition module 302 is further configured for receiving notifications that one or more monitors have been added to or removed from a first monitor configuration or the first monitor configuration has been rearranged. The resulting monitor configuration may be considered a second monitor configuration and the composition module 302 may streamline the transition between the first monitor configuration to the second monitor configuration, as described below.

Figure 4:
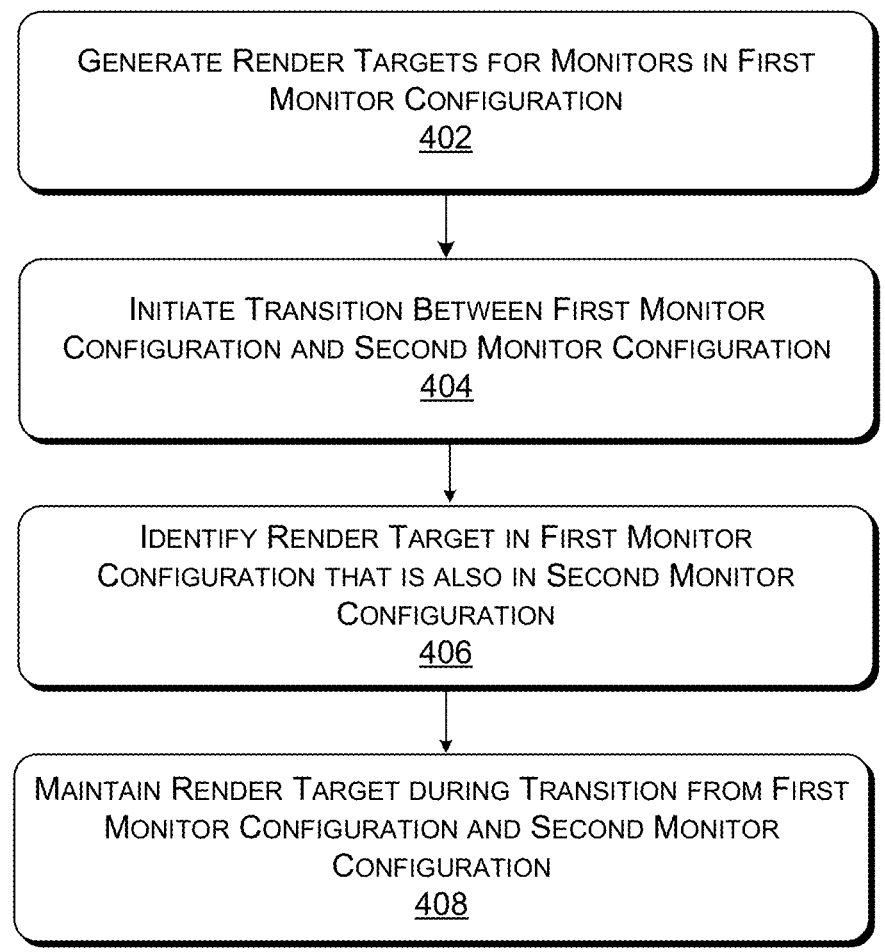
FIG. 4 illustrates an example process for streamlining transitions between monitor configurations by maintaining render targets during a transition from a first monitor configuration to a second monitor configuration.

FIG. 4 illustrates an example process 400 for streamlining transitions between monitor configurations by maintaining render targets during the transition from a first monitor configuration to a second monitor configuration.

Block 402 illustrates generating render targets for monitors in a first monitor configuration. Generally, the composition module 302 (e.g., composition module 216 and/or composition module 226) writes data to be rendered to a buffer, or render target. The composition module 302 composites each of the render targets into a final image that may be presented to a driver for drawing graphical data and/or a UI window to the graphical UI of a user device 208. The composition module 302 may generate the render targets at a native monitor resolution, as described above.

Block 404 illustrates initiating a transition between the first monitor configuration and a second monitor configuration. In at least one example, the composition module 302 receives a notification of a change in the configuration of the monitors. The notification is issued by a runtime associated with the operating system when a monitor configuration change has been initiated. A first monitor configuration may change if one or more monitors are added or removed. Additionally or alternatively, the first monitor configuration may change if the arrangement of the monitors in the first monitor configuration is changed. In at least some examples, the first monitor configuration may change when there is a mode change to at least one monitor in the first monitor configuration. The resulting monitor configurations in any of the above situations may be called second monitor configurations. As a result of receiving the notification, the composition module 302 initiates a transition between the first monitor configuration and the second monitor configuration.

Block 406 illustrates the composition module 302 identifying at least one render target in the first monitor configuration that is also in the second monitor configuration. As described above, the composition module 302 compares render targets associated with the monitors in the first monitor configuration and monitors in the second monitor configuration to identify render targets that are present in both configurations. As a result, the render targets may persist so that the system does not rebuild the render targets to transition from the first monitor configuration to the second monitor configuration.

Block 408 illustrates maintaining the at least one render target during the transition between the first monitor configuration and the second monitor configuration. In at least one example, at least one primary frame buffer 306A and/or 306B may be maintained in addition to the at least one render target. Maintaining the at least one render target and the at least one primary frame buffer 306A and/or 306B in the first monitor configuration and the second monitor configuration may represent keeping the at least one render target and the at least one primary frame buffer 306A and/or 306B present during the transition between the first monitor configuration and the second monitor configuration. In some examples, maintaining the at least one render target and/or the at least one primary frame buffer 306A and/or 306B may include storing and/or caching the render targets and/or primary frame buffers 306A and/or 306B. As a result, the at least one render target and the at least one primary frame buffer 306A and/or 306B persist in both configurations instead of being torn down following the notification of changes to the first monitor configuration and rebuilt for the second monitor configuration. In some examples, monitor timing may also be maintained during the transition between the first monitor configuration and the second monitor configuration, as described above. As a result of at least the maintaining the render targets, primary frame buffers 306A and/or 306B, and monitor timing, transitioning from a first monitor configuration to a second monitor configuration may occur without the black frames and other drawbacks that are experienced using current techniques. Accordingly, the techniques described herein streamline transitions between monitor configurations.

Figure 5:
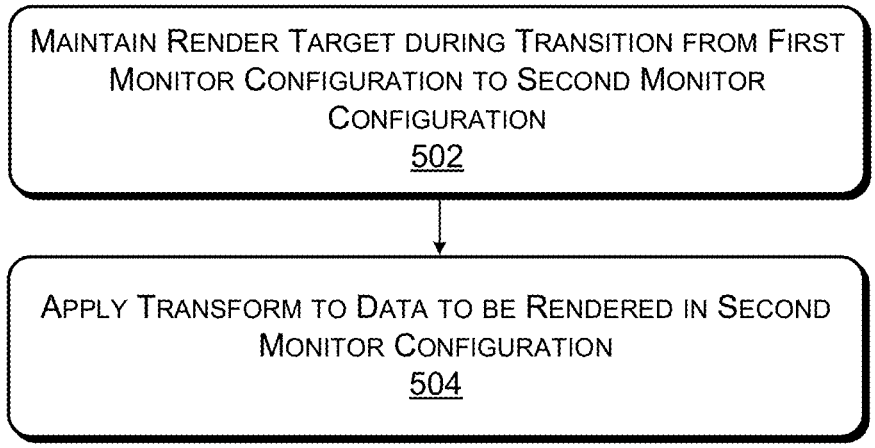
FIG. 5 illustrates an example process for streamlining transitions between monitor configurations by applying at least one transform to data to be rendered in a second monitor configuration.

FIG. 5 illustrates an example process 500 for streamlining transitions between monitor configurations by applying at least one transform to data to be rendered in a second monitor configuration.

Block 502 illustrates maintaining the at least one render target during the transition from the first monitor configuration to the second monitor configuration, as described above. As described above, maintaining the at least one render target and the at least one primary frame buffer 306A and/or 306B in the first monitor configuration and the second monitor configuration may represent keeping the at least one render target and the at least one primary frame buffer 306A and/or 306B present during the transition between the first monitor configuration and the second monitor configuration. In some examples, maintaining the at least one render target and/or the at least one primary frame buffer 306A and/or 306B may include storing and/or caching the render targets, primary frame buffers 306A and/or 306B, etc.

Block 504 illustrates applying at least one transform to data to be rendered in the second monitor configuration. Upon receiving notification of a change to the first monitor configuration, the composition module 302 may identify transforms to apply to display presentation composition trees so that when drivers render the display presentation composition trees on monitors associated with the second configuration, the presentation on the UI of the user device 208 accurately reflects the presentation from the first monitor configuration. The transforms may include rotating, translating, and/or scaling. In at least one example, the composite module 302 may apply the transforms while rendering the composition tree to a monitor in the second monitor configuration.

CONCLUSION

In closing, although the various embodiments have been described in language specific to structural features and/or methodical acts, it is to be understood that the subject matter defined in the appended representations is not necessarily limited to the specific features or acts described. Rather, the specific features and acts are disclosed as example forms of implementing the claimed subject matter.

Example Clauses

A. A computer-implemented method comprising: generating render targets for monitors in a first monitor configuration; initiating a transition between the first monitor configuration and a second monitor configuration; identifying at least one render target in the first monitor configuration that is also in the second monitor configuration; and in response to identifying the at least one render target in the first monitor configuration that is also in the second monitor configuration: maintaining the at least one render target in the transition between the first monitor configuration and the second monitor configuration; and applying at least one transform to data to be rendered in the second monitor configuration.

B. The computer-implemented method as paragraph A recites, wherein generating the render targets comprises generating render targets at a native monitor resolution of the monitors in the first monitor configuration.

C. The computer-implemented method as either paragraph A or B recites, a new monitor that was not in the first monitor configuration; some of the monitors in the first monitor configuration; or same monitors as the monitors in the first monitor configuration arranged in a different configuration than the first monitor configuration.

D. The computer-implemented method as any one of paragraphs A-C recites, further comprising maintaining the at least one render target and at least one primary frame buffer in the first monitor configuration and the second monitor configuration.

E. The computer-implemented method as paragraph D recites, wherein the maintaining the at least one render target and the at least one primary frame buffer in the first monitor configuration and the second monitor configuration comprises storing the at least one render target and the at least one primary frame buffer present during the transition between the first monitor configuration and the second monitor configuration.

F. The computer-implemented method as any one of paragraphs A-D recite, wherein the applying the at least one transform comprises rendering a composition tree associated with the data to be rendered to a monitor in the second monitor configuration.

G. The computer-implemented method as paragraph F recites, wherein the at least one transform comprises rotations, translations, or scalars.

H. The computer-implemented method as any one of paragraphs A-D or F recites, wherein the applying the at least one transform comprises stretching data rendered on at least one monitor in the first monitor configuration to a native resolution of at least one monitor in the second monitor configuration to avoid re-programming monitor timing during the transition.

I. One or more computer-readable media encoded with instructions that, when executed by a processor, configure a computer to perform acts comprising: generating render targets for monitors in a first monitor configuration; receiving an indication of an addition of a new monitor; initiating a transition to a second monitor configuration; identifying at least one render target in the first monitor configuration that is also in the second configuration; and maintaining the at least one render target during the transition from the first monitor configuration to the second monitor configuration.

J. The computer-readable media as paragraph I recites, wherein the generating render targets comprises generating render targets at a native monitor resolution of the monitors in the first monitor configuration.

K. The computer-readable media as either paragraph I or J recites, the acts further comprising applying at least one transform to data to be rendered in the second monitor configuration.

L. The computer-readable media as paragraph K recites, wherein the acts further comprise, responsive to applying the at least one transform, rendering a composition tree associated with the data to be rendered to a monitor in the second configuration.

M. The computer-readable media as either paragraph K or L recites, wherein the at least one transform comprises rotations, translations, or scalar adjustments.

N. The computer-readable media as any one of paragraphs I-K recites, wherein maintaining the at least one render target further includes maintaining at least one primary frame buffer and maintaining the at least one render target and the at least one primary frame buffer comprises storing the at least one render target and the at least one primary frame buffer without tearing down the at least one render target and the at least one primary frame buffer or recreating new render targets and new primary frame buffers for the second monitor configuration.

O. The computer-readable media as any one of paragraphs I-K or N recites, wherein the monitors in the first monitor configuration and monitors in the second monitor configuration are attached to GPUs.

P. A system comprising: memory; one or more processors; and one or more modules stored in the memory and executable by the one or more processors, the one or more modules including a composition module configured to: generate render targets for data to be rendered on monitors in a first monitor configuration and a second monitor configuration; identify at least one render target in the first monitor configuration that is also in the second monitor configuration; maintain the at least one render target during a transition from the first monitor configuration to the second monitor configuration; and apply at least one transform to the data to be rendered on at least one monitor in the second monitor configuration to complete the transition between the first monitor configuration and the second monitor configuration.

Q. The system as paragraph P recites further comprising: at least one primary frame buffer configured to generate a display from the render targets; and at least one digital to analog converter configured to convert digital data from the at least one primary frame buffer into an analog signal that is output to screen drivers to display a presentation on the monitors in the second monitor configuration.

R. The system as paragraph Q recites, wherein the composition module comprises a graphics runtime configured to enumerate hardware devices, present rendered frames to an output, control gamma, and manage a full-screen transition from the first monitor configuration to the second monitor configuration.

S. The system as paragraph R recites, wherein the graphics runtime is further configured to apply the at least one transform to the render targets before the data to be rendered is transferred to the at least one primary frame buffer.

T. The system as any one of paragraphs P or Q recites, wherein the transition comprises at least one of: addition of a monitor to the first monitor configuration; removal of a monitor from the first monitor configuration; or rearrangement of the monitors in the first monitor configuration.

What is claimed is:

1. A computer-implemented method comprising:
generating a first set of render targets for monitors in a first monitor configuration, the first set of render targets being associated with a particular monitor timing;
determining that a new monitor is added to the monitors, a monitor of the monitors is removed, or the monitors are reconfigured to generate a second monitor configuration;
determining that a first render target of the first set of render targets and a second render target of a second set of render targets associated with the second monitor configuration are a same render target; and
causing a transition between the first monitor configuration and the second monitor configuration, based on:
maintaining the first render target in the transition between the first monitor configuration and the second monitor configuration;
reserving the particular monitor timing during the transition; and
applying at least one transform to data to be rendered in the second monitor configuration.

2. The computer-implemented method of claim 1, wherein generating the first set of render targets comprises generating render targets at a native monitor resolution of the monitors in the first monitor configuration.

3. The computer-implemented method of claim 2, wherein reserving the particular monitor timing during the transition and applying the at least one transform to data to be rendered in the second monitor configuration are performed instead of re-programming the particular monitor timing during the transition.

4. The computer-implemented method of claim 1, further comprising maintaining the first render target and at least one primary frame buffer in the first monitor configuration and the second monitor configuration.

5. The computer-implemented method of claim 4, wherein the maintaining the first render target and the at least one primary frame buffer in the first monitor configuration and the second monitor configuration comprises storing the first render target and the at least one primary frame buffer present during the transition between the first monitor configuration and the second monitor configuration.

6. The computer-implemented method of claim 1, wherein the applying the at least one transform comprises rendering a composition tree associated with the data to be rendered to a monitor in the second monitor configuration.

7. The computer-implemented method of claim 1, wherein the applying the at least one transform comprises stretching data rendered on at least one monitor in the first monitor configuration to a native resolution of at least one monitor in the second monitor configuration to avoid re-programming monitor timing during the transition.

8. One or more computer storage media encoded with instructions that, when executed by a processor, configure a computer to perform acts comprising:
generating a first set of render targets for monitors in a first monitor configuration, the first set of render targets being associated with a particular monitor timing;
receiving an indication of an addition of a new monitor;
initiating a transition to a second monitor configuration, the second monitor configuration being associated with a second set of render targets;
determining that at least one render target in the first set of render targets is also in the second set of render targets;
maintaining the at least one render target during the transition from the first monitor configuration to the second monitor configuration; and
reserving the particular monitor timing during the transition from the first monitor configuration to the second monitor configuration.

9. The computer storage media of claim 8, wherein the generating the first set of render targets comprises generating render targets at a native monitor resolution of the monitors in the first monitor configuration.

10. The computer storage media of claim 8, the acts further comprising applying at least one transform to data to be rendered in the second monitor configuration.

11. The computer storage media of claim 10, the acts further comprising, responsive to applying the at least one transform, rendering a composition tree associated with the data to be rendered to a monitor in the second configuration.

12. The computer storage media of claim 11, wherein the at least one transform comprises a rotation, a translation, or a scalar adjustment.

13. The computer storage media of claim 8, wherein:
maintaining the at least one render target further includes maintaining at least one primary frame buffer; and
maintaining the at least one render target and the at least one primary frame buffer comprises storing the at least one render target and the at least one primary frame buffer without tearing down the at least one render target and the at least one primary frame buffer or recreating new render targets and new primary frame buffers for the second monitor configuration.

14. The computer storage media of claim 8, wherein the monitors in the first monitor configuration and monitors in the second monitor configuration are attached to graphics processing units.

15. A system comprising:
memory;
one or more processors; and
one or more modules stored in the memory and executable by the one or more processors, the one or more modules including a composition module configured to:
generate a first set of render targets for data to be rendered on first monitors in a first monitor configuration and a second set of render targets to be rendered on second monitors in a second monitor configuration, the first set of render targets and the second set of render targets being associated with a particular monitor timing;
maintain the at least one render target during a transition from the first monitor configuration to the second monitor configuration;
reserve the particular monitor timing during the transition from the first monitor configuration to the second monitor configuration; and apply at least one transform to the data to be rendered on at least one monitor in the second monitor configuration to complete the transition between the first monitor configuration and the second monitor configuration.

16. The system of claim 15 further comprising:

at least one primary frame buffer configured to generate a display from the second set of render targets; and at least one digital to analog converter configured to convert digital data from the at least one primary frame buffer into an analog signal that is output to screen drivers to display a presentation on the monitors in the second monitor configuration.

17. The system of claim 16, wherein the composition module comprises a graphics runtime configured to enumerate hardware devices, present rendered frames to an output, control gamma, and manage a full-screen transition from the first monitor configuration to the second monitor configuration.

18. The system of claim 17, wherein the graphics runtime is further configured to apply the at least one transform to the data before the data is transferred to the at least one primary frame buffer.

19. The system of claim 15, wherein the transition comprises at least one of:

addition of a monitor to the first monitor configuration;

removal of a monitor from the first monitor configuration; or rearrangement of the monitors in the first monitor configuration.

20. The system of claim 15, wherein the at least one render target comprises a buffer where a processor of the one or more processors draws the data to be rendered.

* * * * *